US012738422B2

(12) United States Patent
Su et al.

(10) Patent No.: US 12,738,422 B2
(45) Date of Patent: Sep. 15, 2026

(54) MOBILE DEVICE AND WOUND CAPACITOR PACKAGE STRUCTURE THEREOF

(71) Applicant: APAQ TECHNOLOGY CO., LTD., Miaoli County (TW)

(72) Inventors: Chung-Jui Su, Kaohsiung City (TW); Ming-Tsung Liang, New Taipei City (TW)

(73) Assignee: APAQ TECHNOLOGY CO., LTD., Taiwan (CN)

(*) Notice: Subject to any disclaimer, the term of this patent is extended or adjusted under 35 U.S.C. 154(b) by 156 days.

(21) Appl. No.: 18/675,305

(22) Filed: May 28, 2024

(65) Prior Publication Data

US 2025/0273396 A1 Aug. 28, 2025

(30) Foreign Application Priority Data

Feb. 23, 2024 (TW) ................................ 113106459

(51) Int. Cl.

*H01G 4/32* (2006.01)
*H01G 4/224* (2006.01)
*H01G 4/236* (2006.01)

(52) U.S. Cl.

CPC ............. *H01G 4/224* (2013.01); *H01G 4/236* (2013.01); *H01G 4/32* (2013.01)

(58) Field of Classification Search

CPC .......... H01G 4/224; H01G 4/236; H01G 4/32; H01G 9/00; H01G 9/08; H01G 9/10; H01G 9/12

See application file for complete search history.

(56) References Cited

U.S. PATENT DOCUMENTS

2008/0117566 A1* 5/2008 Fujimoto ............... H01G 9/151 361/536
2012/0236469 A1* 9/2012 Takahara ................. H01G 9/10 361/518
2014/0168860 A1* 6/2014 Nakashima .......... H01G 9/0029 29/25.03
2017/0110254 A1* 4/2017 Chien ...................... H01G 9/08

(Continued)

*Primary Examiner* — Timothy J. Dole
*Assistant Examiner* — Esther N Lian
(74) *Attorney, Agent, or Firm* — Li & Cai Intellectual Property (USA) Office

(57) ABSTRACT

A mobile device and a wound capacitor package structure thereof are provided. The wound capacitor package structure includes a wound assembly, a conductive assembly and a packaging assembly. The conductive assembly includes a first conductive pin and a second conductive pin. The packaging assembly includes a filling body for completely encapsulating the wound assembly, and a single-piece packaging casing for accommodating the filling body. The filling body includes a bottom filling material layer configured to encapsulate the wound assembly and a part of the conductive assembly. The single-piece packaging casing has an annular deformation structure configured for surroundingly accommodating the top filling material layer. The top filling material layer of the filling body cannot be squeezed by the annular deformation structure, and the first conductive pin and the second conductive pin of the conductive assembly cannot be offset relative to the wound assembly by the annular deformation structure.

10 Claims, 12 Drawing Sheets

(56) References Cited

U.S. PATENT DOCUMENTS

2018/0122579 A1* 5/2018 Liu ........................ H01G 9/145
2018/0166221 A1* 6/2018 Chen ...................... H01G 9/145
2018/0240605 A1* 8/2018 Nakashima ............ H01G 9/008
2019/0096589 A1* 3/2019 Chen ...................... H01G 9/028
2019/0341197 A1* 11/2019 Chen ...................... H01G 9/151
2021/0296054 A1* 9/2021 Lin ........................ H01G 9/012
2021/0391118 A1* 12/2021 Lin ........................ H01G 11/82
2021/0391119 A1* 12/2021 Lin ........................ H01G 13/02

* cited by examiner

MOBILE DEVICE AND WOUND CAPACITOR PACKAGE STRUCTURE THEREOF

CROSS-REFERENCE TO RELATED PATENT APPLICATION

This application claims the benefit of priority to Taiwan Patent Application No. 113106459, filed on Feb. 23, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a capacitor package structure, and more particularly to a wound capacitor package structure and a mobile device configured to use the wound capacitor package structure.

BACKGROUND OF THE DISCLOSURE

In the related art, various applications of capacitors include being used in home appliances, computer motherboards and peripherals, power supplies, communication products and automobiles. Capacitors such as solid electrolytic capacitors are mainly used to provide functions such as filtering, bypassing, rectifying, coupling, blocking and transforming. However, there is still room for improvement in the related art of the wound capacitor.

SUMMARY OF THE DISCLOSURE

In response to the above-referenced technical inadequacy, the present disclosure provides a mobile device and a wound capacitor package structure thereof, in which a filling body cannot be squeezed by a single-piece packaging casing, and a first conductive pin and a second conductive pin cannot be offset relative to a wound assembly by the single-piece packaging casing.

In order to solve the above-mentioned problems, one of the technical aspects adopted by the present disclosure is to provide a wound capacitor package structure and a mobile device configured to use the wound capacitor package structure. The wound capacitor package structure includes a wound assembly, a conductive assembly and a packaging assembly. The conductive assembly includes a first conductive pin electrically contacting the wound assembly and a second conductive pin electrically contacting the wound assembly. The packaging assembly is configured to completely encapsulate the wound assembly. The first conductive pin includes a first embedded portion accommodated inside the packaging assembly and a first exposed portion exposed outside the packaging assembly, and the second conductive pin includes a second embedded portion accommodated inside the packaging assembly and a second exposed portion exposed outside the packaging assembly. The packaging assembly includes a filling body for completely encapsulating the wound assembly and a single-piece packaging casing for accommodating the filling body. The filling body includes a bottom filling material layer and a top filling material layer connected to the bottom filling material layer, the bottom filling material layer is configured to encapsulate a first portion of the wound assembly, and the top filling material layer is configured to encapsulate a second portion of the wound assembly, the first embedded portion of the first conductive pin and the second embedded portion of the second conductive pin. The single-piece packaging casing has an annular upright structure and an annular deformation structure connected to the annular upright structure, the annular upright structure is configured for surroundingly accommodating the bottom filling material layer and a first portion of the top filling material layer, and the annular deformation structure is configured for surroundingly accommodating a second portion of the top filling material layer. The top filling material layer of the filling body is not squeezed by the annular deformation structure, and the first conductive pin and the second conductive pin of the conductive assembly are not offset relative to the wound assembly by the annular deformation structure.

Therefore, in the mobile device and the wound capacitor package structure thereof provided by the present disclosure, by virtue of "the packaging assembly including a filling body for completely encapsulating the wound assembly and a single-piece packaging casing for accommodating the filling body," "the filling body including a bottom filling material layer and a top filling material layer connected to the bottom filling material layer, the bottom filling material layer being configured to encapsulate a first portion of the wound assembly, and the top filling material layer being configured to encapsulate a second portion of the wound assembly, the first embedded portion of the first conductive pin and the second embedded portion of the second conductive pin" and "the single-piece packaging casing having an annular upright structure and an annular deformation structure connected to the annular upright structure, the annular upright structure being configured for surroundingly accommodating the bottom filling material layer and a first portion of the top filling material layer, and the annular deformation structure being configured for surroundingly accommodating a second portion of the top filling material layer," the top filling material layer of the filling body cannot be squeezed by the annular deformation structure, and the first conductive pin and the second conductive pin of the conductive assembly cannot be offset relative to the wound assembly by the annular deformation structure.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
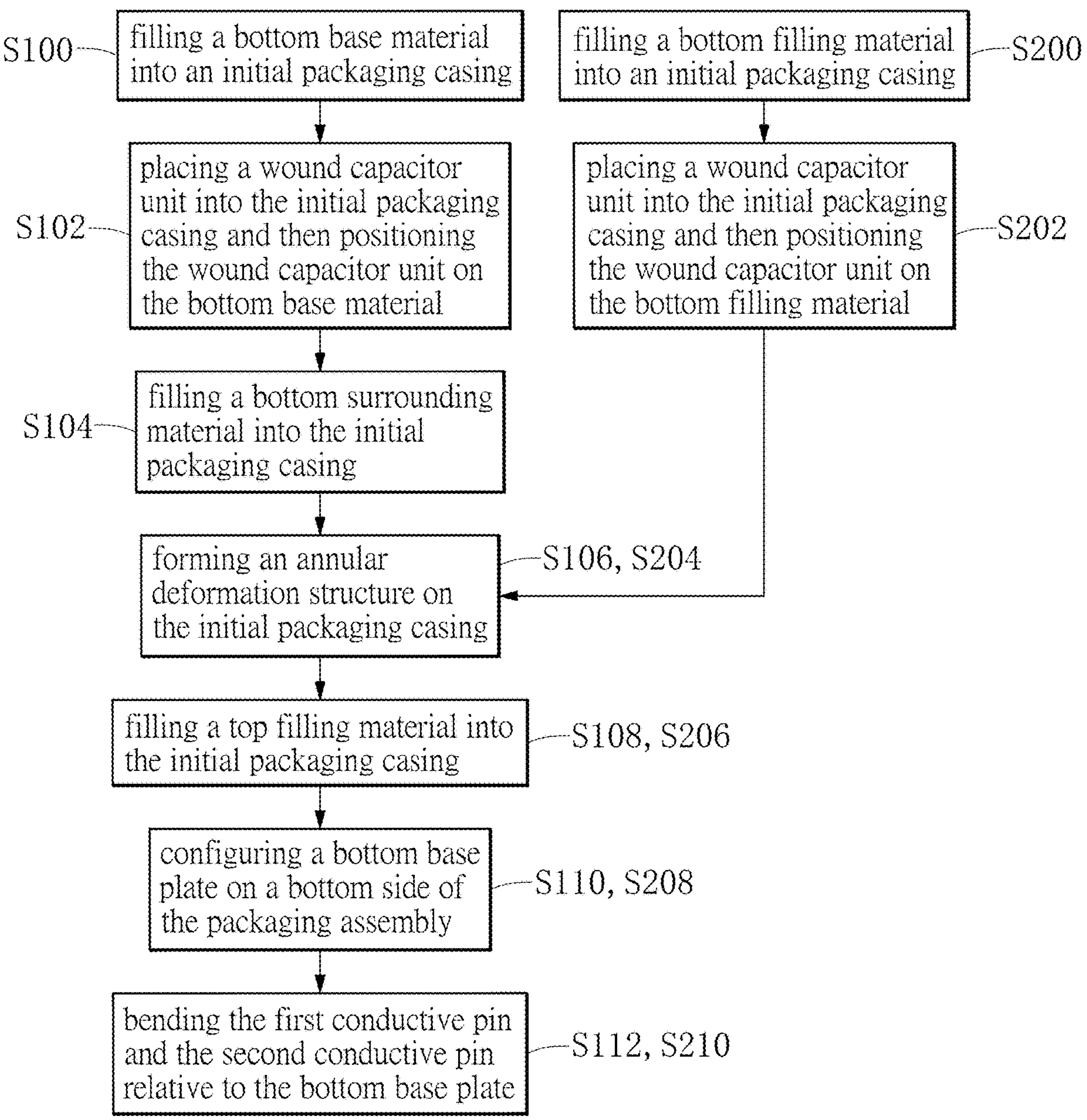
FIG. 1 is a flowchart of a method of manufacturing a wound capacitor package structure provided by the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Figure 2:
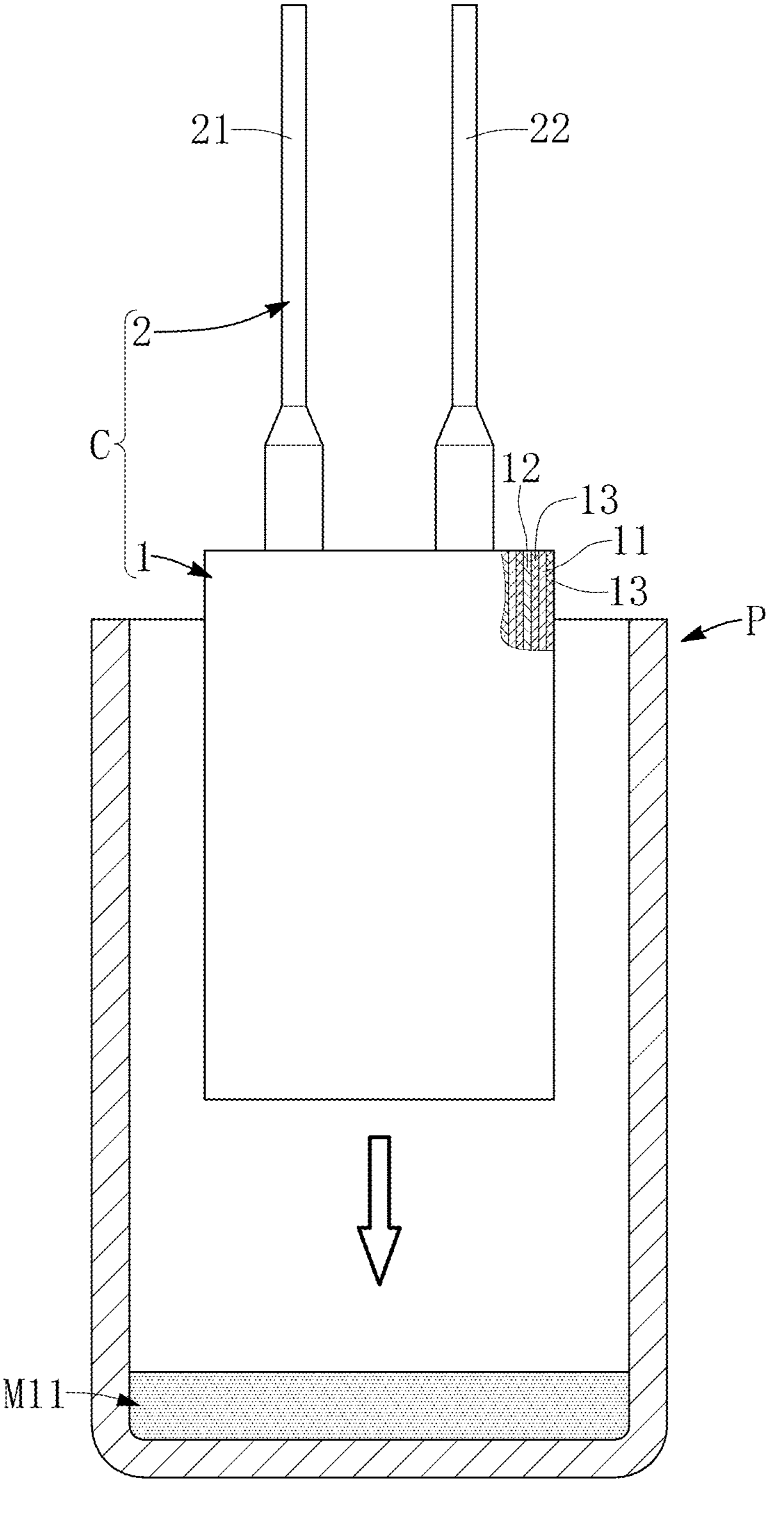
FIG. 2 is a schematic view of step S100 of the method of manufacturing the wound capacitor package structure provided by a first embodiment of the present disclosure.
Figure 3:
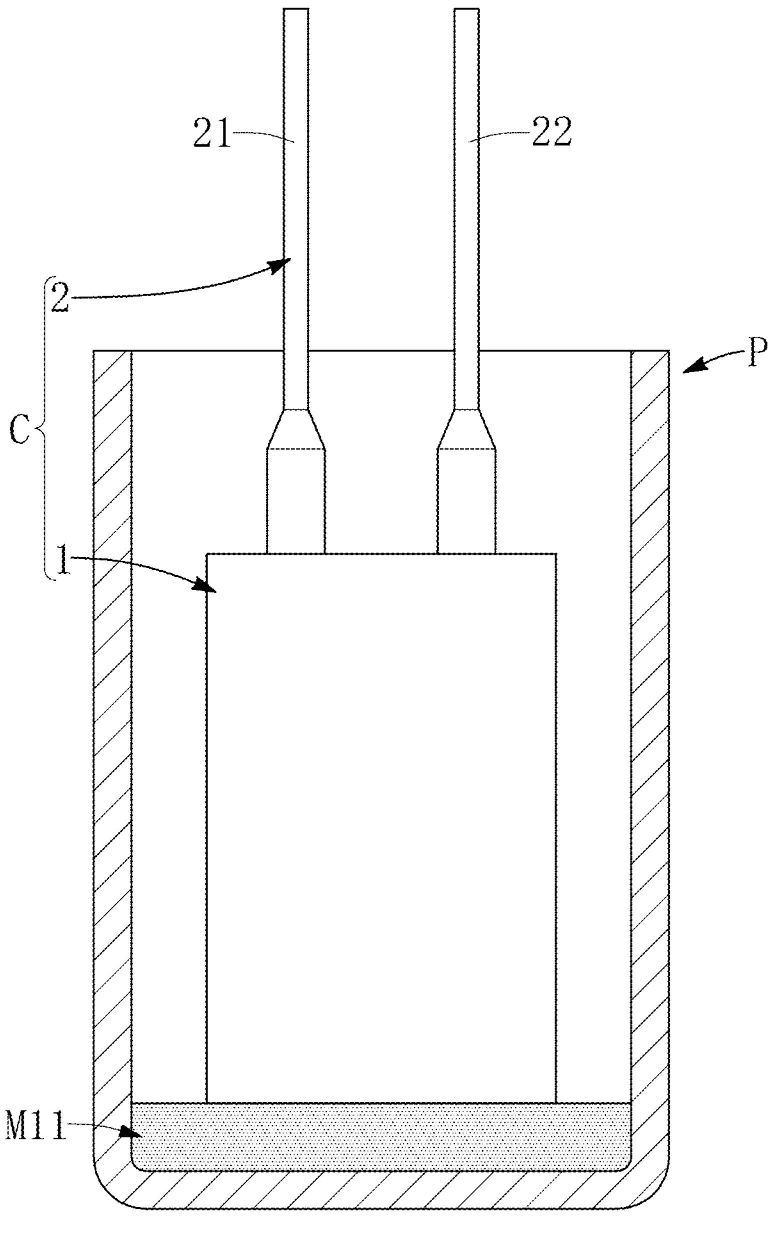
FIG. 3 is a schematic view of step S102 of the method of manufacturing the wound capacitor package structure provided by the first embodiment of the present disclosure.
Figure 4:
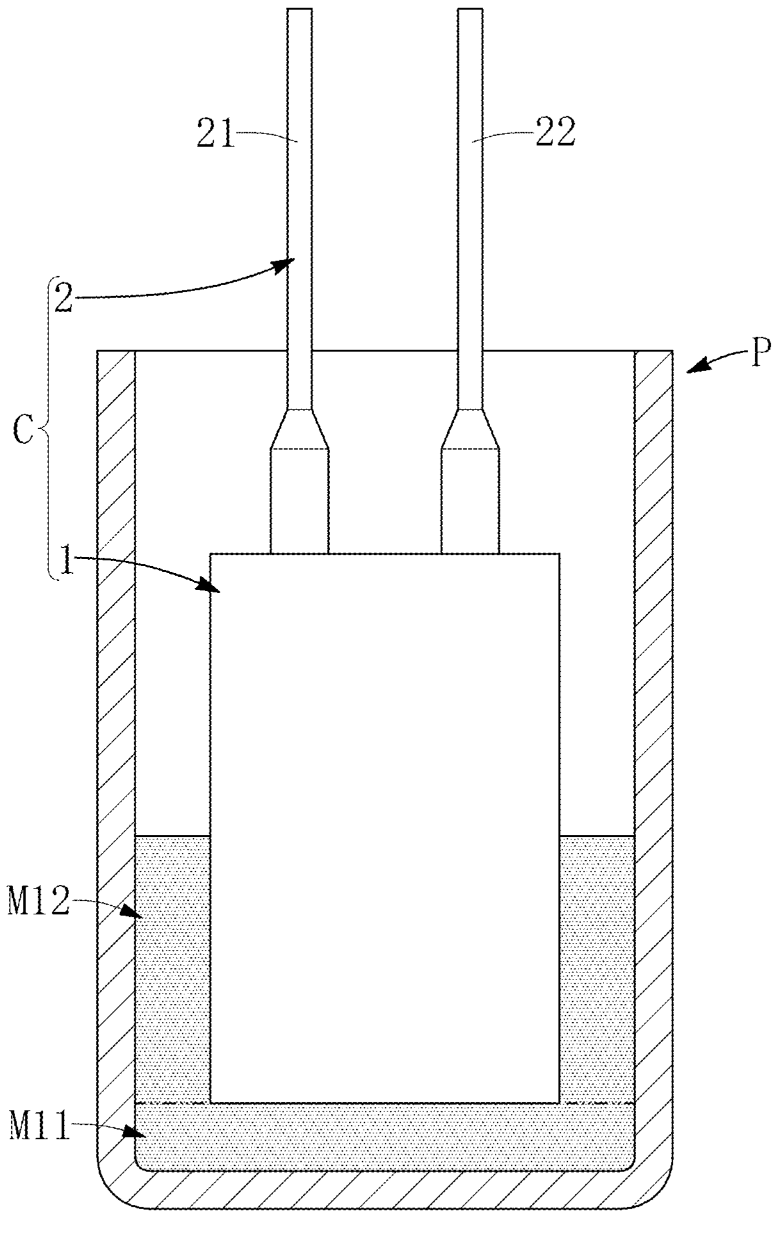
FIG. 4 is a schematic view of step S104 of the method of manufacturing the wound capacitor package structure provided by the first embodiment of the present disclosure.
Figure 5:
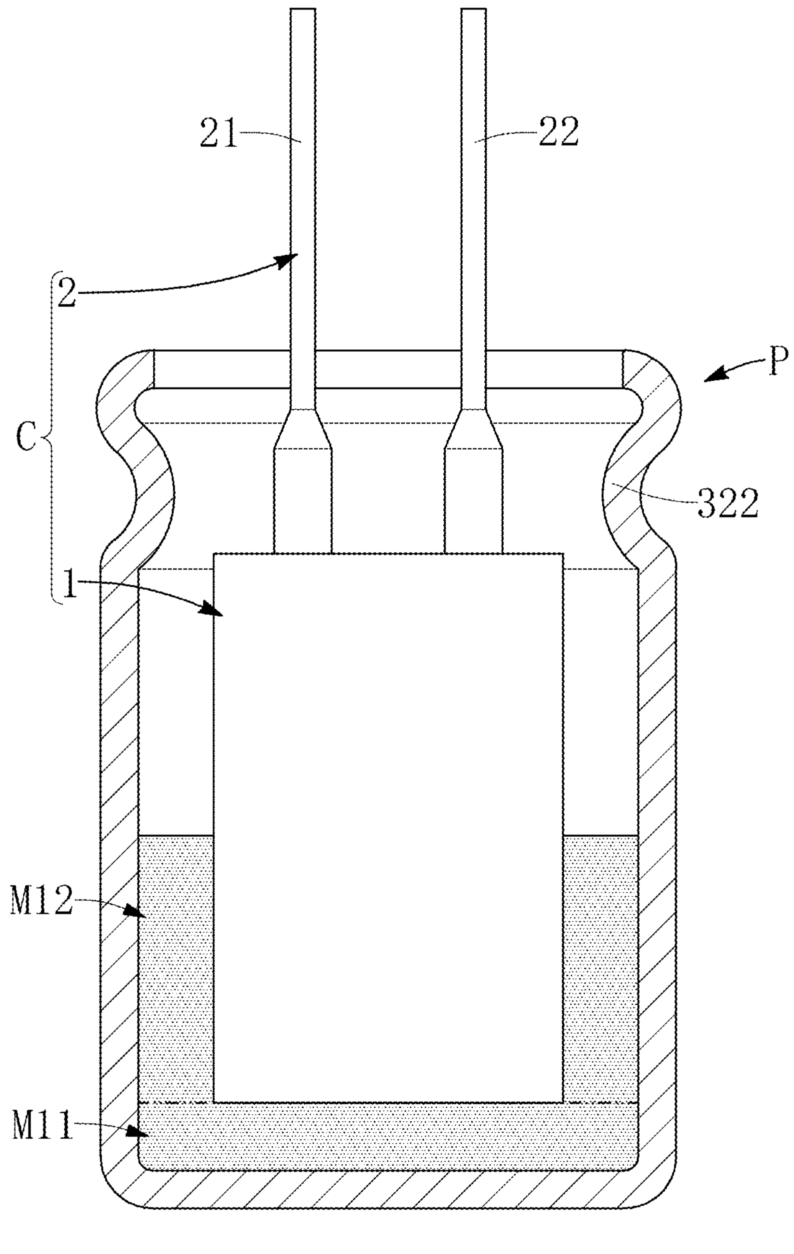
FIG. 5 is a schematic view of step S106 of the method of manufacturing the wound capacitor package structure provided by the first embodiment of the present disclosure.
Figure 6:
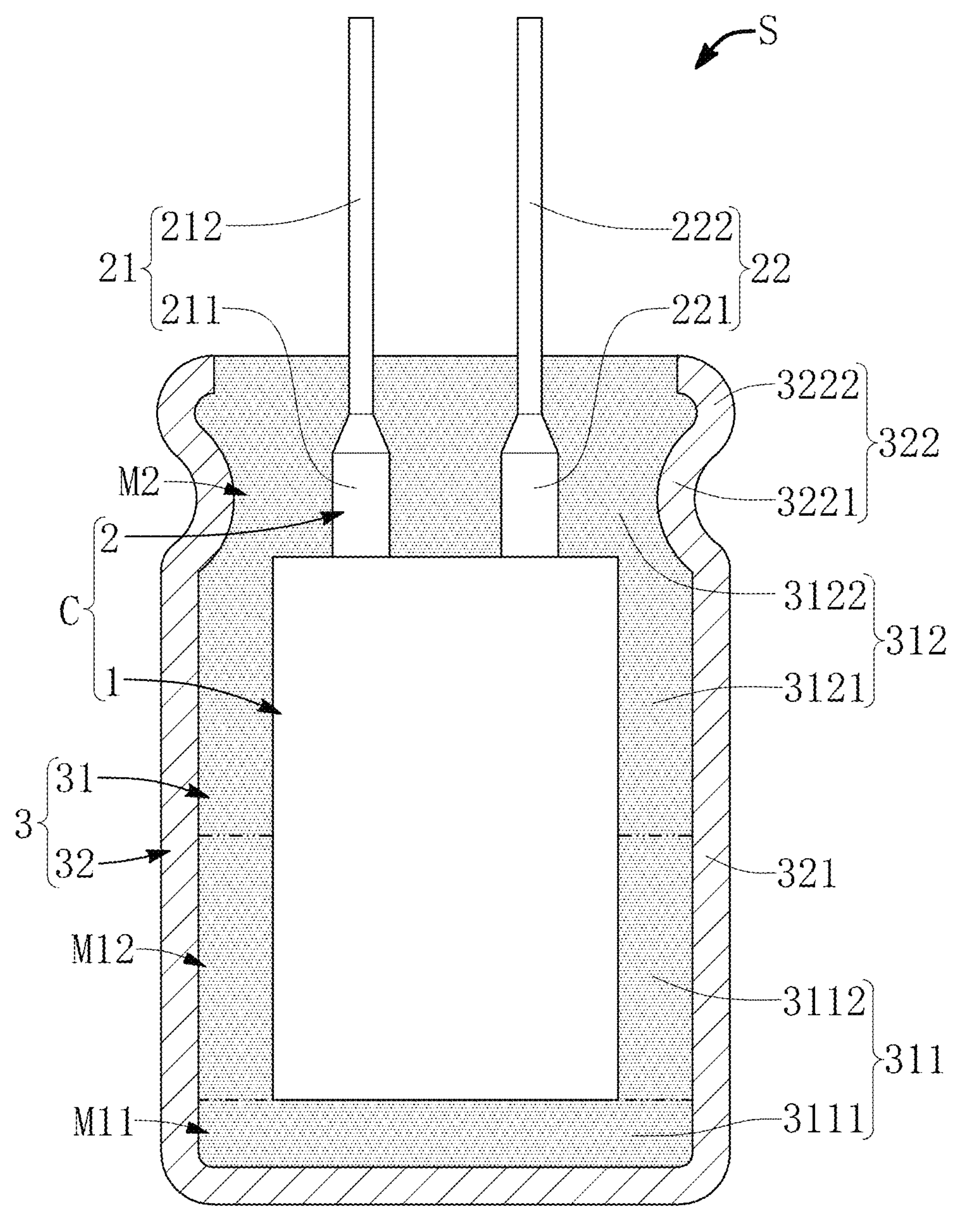
FIG. 6 is a schematic view of step S108 of the method of manufacturing the wound capacitor package structure provided by the first embodiment of the present disclosure (or a schematic structural diagram of the wound capacitor package structure provided by the first embodiment of the present disclosure)

Referring to FIG. 1 to FIG. 6, a first embodiment of the present disclosure provides a method for manufacturing a wound capacitor package structure, which includes: firstly, referring to FIG. 1 and FIG. 2, filling a bottom base material M11 into an initial packaging casing P (step S100); next, referring to FIG. 1, FIG. 2 and FIG. 3, placing a wound capacitor unit C (including a wound assembly 1 and a conductive assembly 2) into the initial packaging casing P and then positioning the wound capacitor unit C on the bottom base material M11 (step S102); then, referring to FIG. 1, FIG. 3 and FIG. 4, filling a bottom surrounding material M12 into the initial packaging casing P to surround and cover a first portion of the wound capacitor unit C (step S104); afterward, referring to FIG. 1, FIG. 4 and FIG. 5, forming an annular deformation structure 322 on the initial packaging casing P (step S106); and then referring to FIG. 1, FIG. 5 and FIG. 6, filling a top filling material M2 into the initial packaging casing P to surround and cover a second portion of the wound capacitor unit C and be limited by the annular deformation structure 322 (step S108).

For example, as shown in FIG. 3, in the step S102 of placing the wound capacitor unit C in the initial packaging casing P and positioning the wound capacitor unit C on the bottom base material M11, the bottom base material M11 can be preheated at a predetermined temperature (such as any positive integer between 150° C. and 200° C.) and a predetermined time (such as any positive integer between 60 seconds and 300 seconds) through a heating device (not shown), so that the bottom base material M11 can be in a semi-cured state (or surface solidified state), thereby firmly positioning the wound capacitor unit C on the bottom base material M11. In addition, as shown in FIG. 5 and FIG. 6, the annular deformation structure 322 can be formed on the initial packaging casing P through a rolling device (not shown), so that the initial packaging casing P can be formed as a single-piece packaging casing 32 (or a one-piece package shell) for accommodating the bottom base material M11, the bottom surrounding material M12 and the top filling material M2. In addition, as shown in FIG. 6, after the step S108 of filling the top filling material M2 into the initial packaging casing P, the bottom base material M11, the bottom surrounding material M12 and the top filling material M2 can be respectively formed as a bottom base material portion 3111, a bottom surrounding material portion 3112 and a top filling material layer 312 at a predetermined temperature (such as any positive integer between 150° C. and 200° C.) and a predetermined time (such as any positive integer between 20 minutes and 40 minutes, or any positive integer between 1200 seconds and 2400 seconds) through a heating device (not shown). It is worth noting that the bottom base material M11, the bottom surrounding material M12 and the top filling material M2 can be made of silicone, epoxy or any kind of encapsulating material. However, the aforementioned details are disclosed for exemplary purposes only, and are not meant to limit the scope of the present disclosure.

Therefore, as shown in FIG. 1 to FIG. 6, a wound capacitor package structure S can be manufactured through the manufacturing method provided by the first embodiment of the present disclosure, which includes a wound assembly 1, a conductive assembly 2 and a packaging assembly 3.

Firstly, referring to FIG. 2 and FIG. 6, the wound assembly 1 includes a wound positive conductive foil 11, a wound negative conductive foil 12 and two wound separators 13 (or two wound insulating papers). For example, one of the two wound separators 13 can be disposed between the wound positive conductive foil 11 and the wound negative conductive foil 12, and one of the wound positive conductive foil 11 and the wound negative conductive foil 12 can be disposed between the two wound separators 13. In addition, the two wound separators 13 can be an insulating paper or insulating foil containing a dipping material such as a conductive polymer. However, the aforementioned details are disclosed for exemplary purposes only, and are not meant to limit the scope of the present disclosure.

Furthermore, as shown in FIG. 6, the conductive assembly 2 includes a first conductive pin 21 electrically contacting the wound positive conductive foil 11 and a second conductive pin 22 electrically contacting the wound negative conductive foil 12. More particularly, the first conductive pin 21 includes a first embedded portion 211 accommodated inside the packaging assembly 3 and a first exposed portion 212 exposed outside the packaging assembly 3, and the second conductive pin 22 includes a second embedded portion 221 accommodated inside the packaging assembly 3 and a second exposed portion 222 exposed outside the packaging assembly 3.

Moreover, as shown in FIG. 6, the packaging assembly 3 can be configured to completely encapsulate or enclose the wound assembly 1, and the packaging assembly 3 includes a filling body 31 for completely encapsulating or enclosing the wound assembly 1 and a single-piece packaging casing 32 (such as an aluminum shell or a packaging shell made of any material) for accommodating the filling body 31. More particularly, the filling body 31 includes a bottom filling material layer 311 and a top filling material layer 312 connected to the bottom filling material layer 311, the bottom filling material layer 311 can be configured to encapsulate or enclose a first portion of the wound assembly 1, and the top filling material layer 312 can be configured to encapsulate or enclose a second portion of the wound assembly 1, the first embedded portion 211 of the first conductive pin 21 and the second embedded portion 221 of the second conductive pin 22. In addition, the single-piece packaging casing 32 has an annular upright structure 321 (or a straight cylindrical structure) and an annular deformation structure 322 (or an annular inward structure) connected to the annular upright structure 321, the annular upright structure 321 can be configured for surroundingly accommodating the bottom filling material layer 311 and a first portion of the top filling material layer 312, and the annular deformation structure 322 can be configured for surroundingly accommodating a second portion of the top filling material layer 312.

For example, as shown in FIG. 6, the bottom filling material layer 311 of the filling body 31 includes a bottom base material portion 3111 configured for positioning the wound assembly 1, and a bottom surrounding material portion 3112 configured for surroundingly covering the first portion of the wound assembly 1, the bottom base material portion 3111 and the bottom surrounding material portion 3112 are two independent portions (or two distinguishable material structure layers), and the bottom base material portion 3111 and the bottom surrounding material portion 3112 are connected with each other to form a connection interface between the bottom base material portion 3111 and the bottom surrounding material portion 3112. Moreover, the top filling material layer 312 of the filling body 31 includes a first top surrounding material portion 3121 connected to the bottom surrounding material portion 3112, and a second top surrounding material portion 3122 connected to the first top surrounding material portion 3121, the first top surrounding material portion 3121 can be configured for surroundingly covering the second portion of the wound assembly 1, and the second top surrounding material portion 3122 can be configured for surroundingly covering the first embedded portion 211 of the first conductive pin 21 and the second embedded portion 221 of the second conductive pin 22 of the conductive assembly 2 (or the second top surrounding material portion 3122 can also be configured to adhere to the bottom seat plate). In addition, the annular deformation structure 322 of the single-piece packaging casing 32 has a surrounding concave position-limiting portion 3221 (or a surrounding inward recessed structure) connected to the annular upright structure 321 and recessed inward, and a surrounding convex end portion 3222 (or a surrounding inward curved structure) connected to the surrounding concave position-limiting portion 3221 and protruded outward, the surrounding concave position-limiting portion 3221 can be configured for surroundingly covering a portion of the second top surrounding material portion 3122 of the top filling material layer 312, and the surrounding convex end portion 3222 can be configured for surroundingly covering another portion of the second top surrounding material portion 3122 of the top filling material layer 312 and configured for completely exposing all of an outer surface of the second top surrounding material portion 3122 of the top filling material layer 312. However, the aforementioned details are disclosed for exemplary purposes only, and are not meant to limit the scope of the present disclosure.

It should be noted that as shown in FIG. 6, the bottom filling material layer 311 (or the bottom base material M11 and the bottom surrounding material M12) and the top filling material layer 312 (or the top filling material M2) have the same or different thermal insulation coefficients. For example, when the top filling material layer 312 and the bottom filling material layer 311 have different thermal conductivity coefficients, the thermal insulation coefficient of the top filling material layer 312 can be greater than the thermal insulation coefficient of the bottom filling material layer 311, thereby reducing the impact of external temperature on the wound assembly 1 through the top filling material layer 312 (or preventing the wound assembly 1 from been impacted by external temperature through the top filling material layer 312). However, the aforementioned details are disclosed for exemplary purposes only, and are not meant to limit the scope of the present disclosure.

It should be noted that as shown in FIG. 6, the bottom filling material layer 311 (or the bottom base material M11 and the bottom surrounding material M12) and the top filling material layer 312 (or the top filling material M2) have the same or different elastic coefficients. For example, when the top filling material layer 312 and the bottom filling material layer 311 have different elastic coefficients, the elastic coefficient of the top filling material layer 312 can be greater than the elastic coefficient of the bottom filling material layer 311, thereby reducing the impact of external forces on the wound assembly 1 through the top filling material layer 312 (or preventing the wound assembly 1 from been impacted by external forces through the top filling material layer 312). However, the aforementioned details are disclosed for exemplary purposes only, and are not meant to limit the scope of the present disclosure.

It should be noted that as shown in FIG. 6, the bottom filling material layer 311 (or the bottom base material M11 and the bottom surrounding material M12) and the top filling material layer 312 (or the top filling material M2) have the same or different viscosity coefficients. For example, when the top filling material layer 312 and the bottom filling material layer 311 have different viscosity coefficients, the viscosity coefficient of the top filling material layer 312 can be greater than the viscosity coefficient of the bottom filling material layer 311, thereby improving the strength of the bottom seat plate 4 adhering to the packaging assembly 3 through the top filling material layer 312. However, the aforementioned details are disclosed for exemplary purposes only, and are not meant to limit the scope of the present disclosure.

It should be noted that as shown in FIG. 6, the bottom filling material layer 311 (or the bottom base material M11 and the bottom surrounding material M12) and the top filling material layer 312 (or the top filling material M2) have the same or different heat resistance. For example, when the top filling material layer 312 and the bottom filling material layer 311 have different heat resistances, the heat resistance of the top filling material layer 312 can be greater than the heat resistance of the bottom filling material layer 311, thereby reducing the deformation of the top filling material layer 312 due to external temperature (or preventing the top filling material layer 312 from been deformed by external temperature). However, the aforementioned details are disclosed for exemplary purposes only, and are not meant to limit the scope of the present disclosure.

Therefore, referring to FIG. 5 and FIG. 6, the step S106 of forming the annular deformation structure 322 on the initial packaging casing P precedes the step S108 of filling the top filling material M2 into the initial packaging casing P, so that the top filling material layer 312 of the filling body 31 cannot be squeezed by the annular deformation structure 322 (or due to the deformation of the annular deformation structure 322 after the step S106 of forming the annular deformation structure 322 on the initial packaging casing P), and the first conductive pin 21 and the second conductive pin 22 of the conductive assembly 2 cannot be offset relative to the wound assembly 1 by the annular deformation structure 322 (or due to the deformation of the annular deformation structure 322 after the step S106 of forming the annular deformation structure 322 on the initial packaging casing P). More particularly, the second top surrounding material portion 3122 of the top filling material layer 312 cannot be squeezed by the annular deformation structure 322 (or due to the deformation of the annular deformation structure 322 after the step S106 of forming the annular deformation structure 322 on the initial packaging casing P), and the first conductive pin 21 and the second conductive pin 22 of the conductive assembly 2 cannot be offset relative to the wound assembly 1 by the second top surrounding material portion 3122 of the top filling material layer 312.

It should be noted that the top filling material layer 312 of the filling body 31 cannot be squeezed by the annular deformation structure 322 (or due to the deformation of the annular deformation structure 322 after the step S106 of forming the annular deformation structure 322 on the initial packaging casing P), thereby avoiding a first moisture path between the top filling material layer 312 and the annular deformation structure 322. Moreover, the first conductive pin 21 of the conductive assembly 2 cannot be offset relative to the wound assembly 1 by the annular deformation structure 322 (or due to the deformation of the annular deformation structure 322 after the step S106 of forming the annular deformation structure 322 on the initial packaging casing P), thereby avoiding a second moisture path between the top filling material layer 312 and the first conductive pin 21. In addition, the second conductive pin 22 of the conductive assembly 2 cannot be offset relative to the wound assembly 1 by the annular deformation structure 322 (or due to the deformation of the annular deformation structure 322 after the step S106 of forming the annular deformation structure 322 on the initial packaging casing P), thereby avoiding a third moisture path between the top filling material layer 312 and the second conductive pin 22.

Second Embodiment

Figure 7:
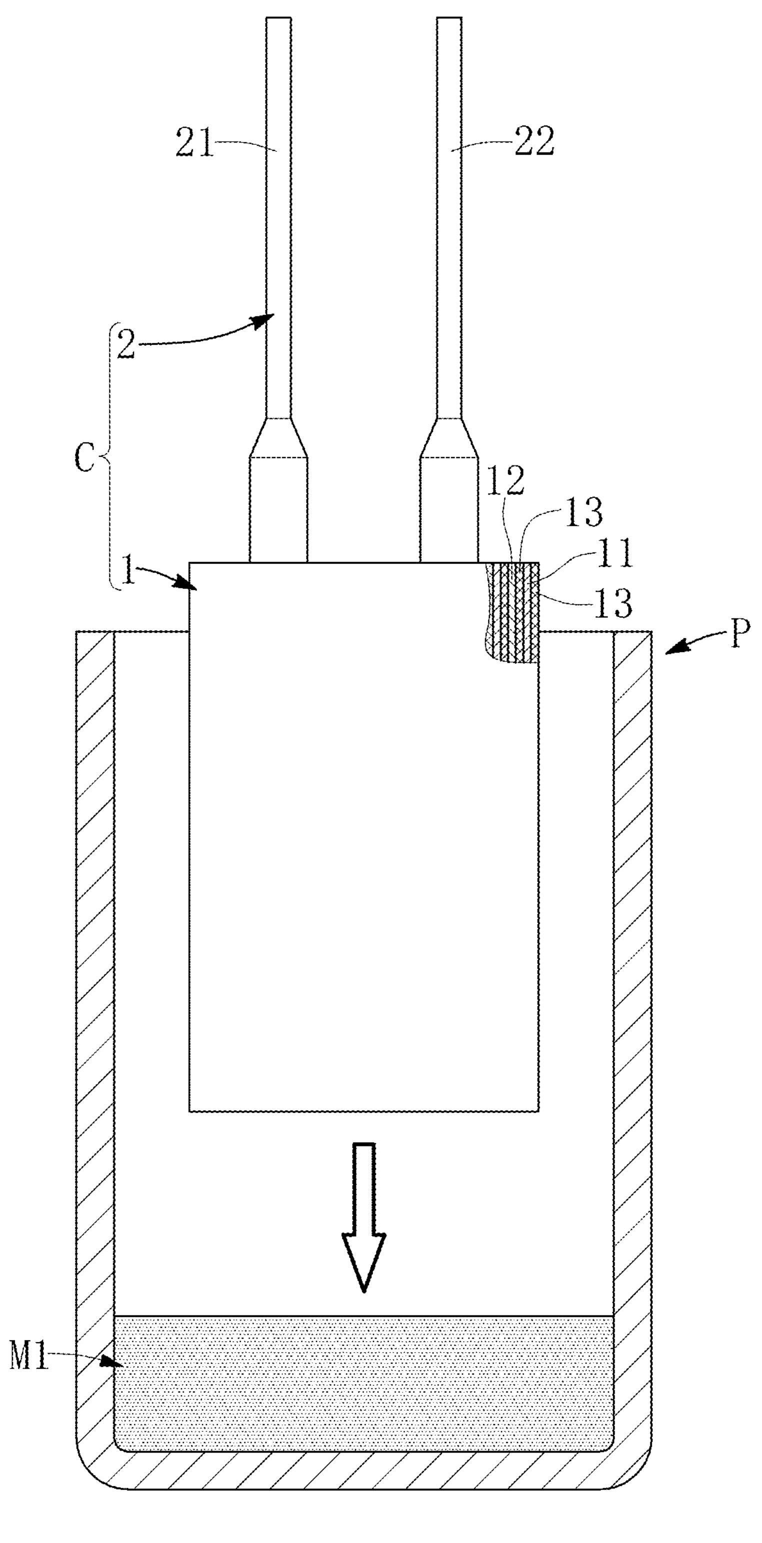
FIG. 7 is a schematic view of step S200 of the method of manufacturing the wound capacitor package structure provided by a second embodiment of the present disclosure.
Figure 8:
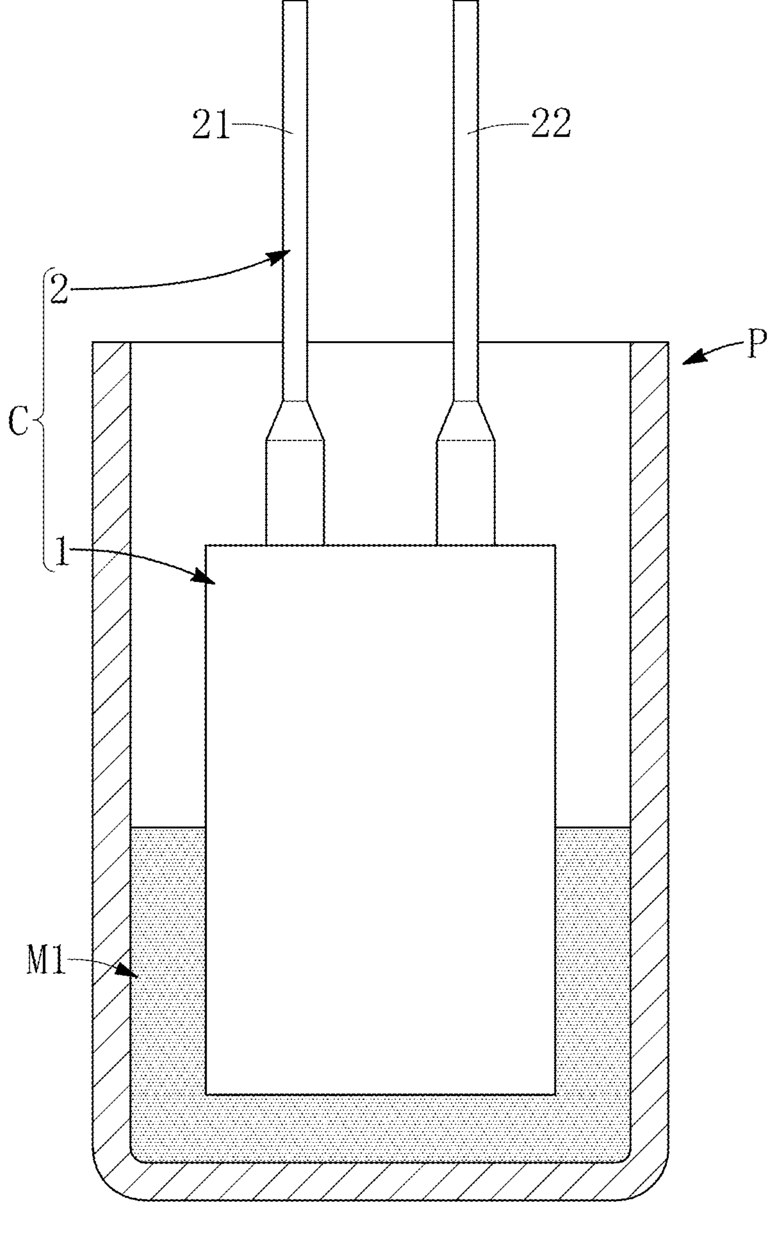
FIG. 8 is a schematic view of step S202 of the method of manufacturing the wound capacitor package structure provided by the second embodiment of the present disclosure.
Figure 9:
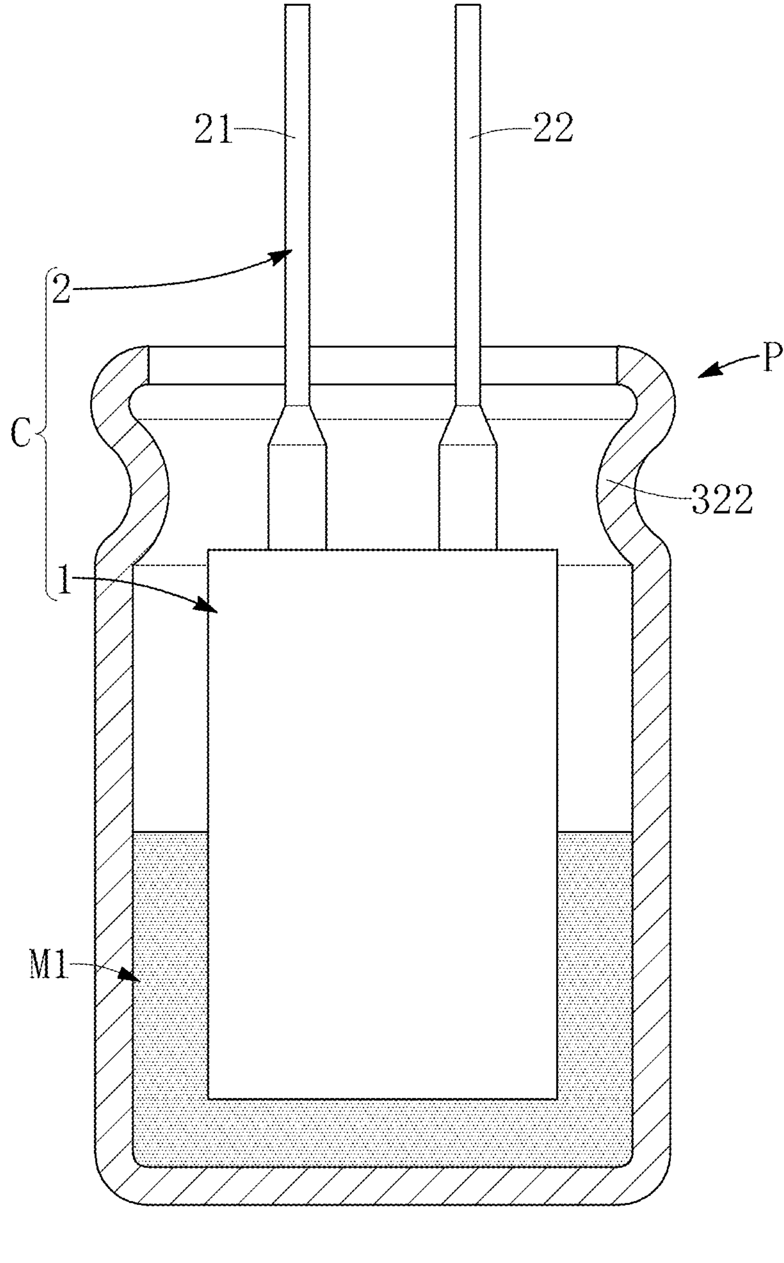
FIG. 9 is a schematic view of step S204 of the method of manufacturing the wound capacitor package structure provided by the second embodiment of the present disclosure.
Figure 10:
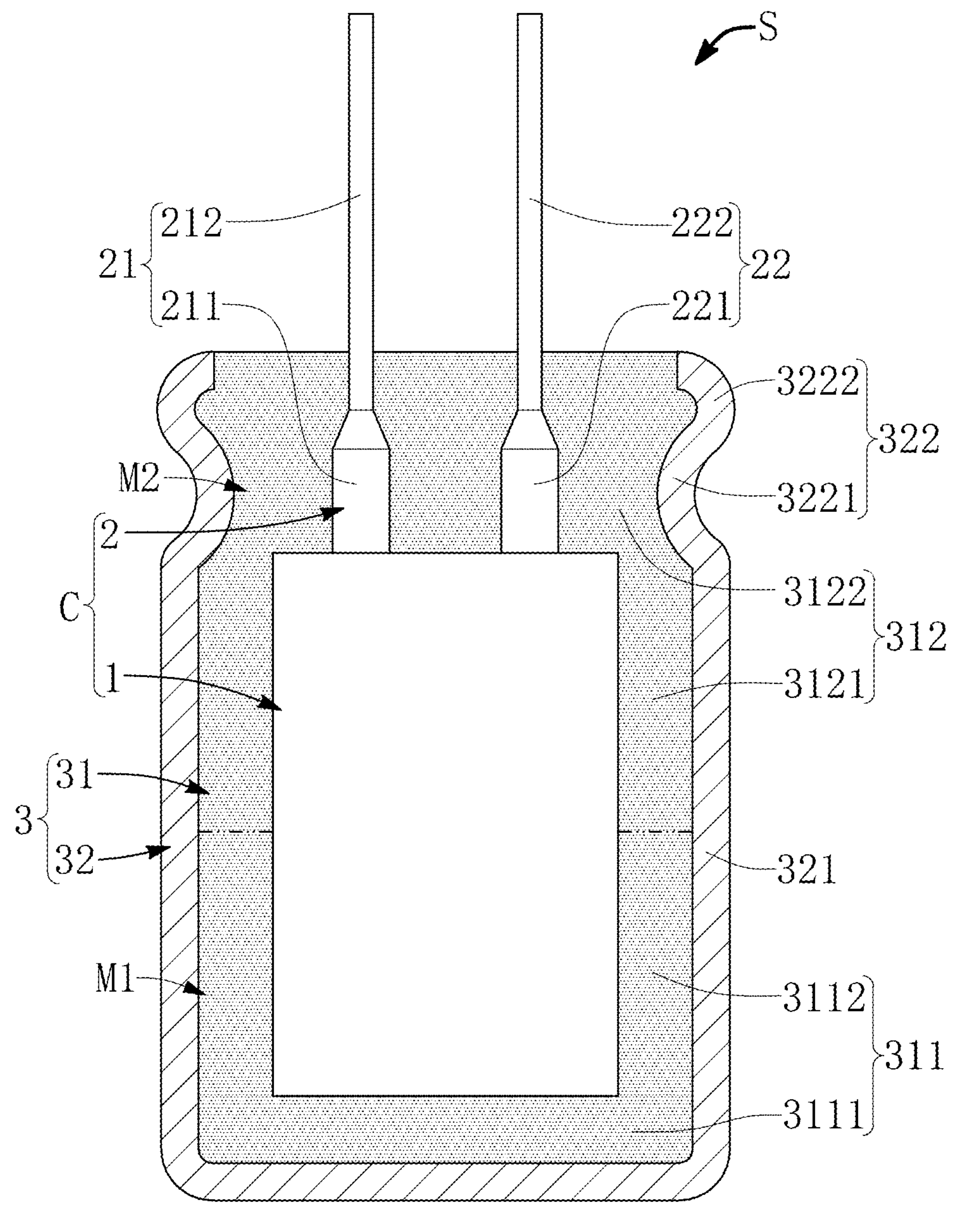
FIG. 10 is a schematic view of step S206 of the method of manufacturing the wound capacitor package structure provided by the second embodiment of the present disclosure (or a schematic structural diagram of the wound capacitor package structure provided by the second embodiment of the present disclosure)

Referring to FIG. 1 and FIG. 7 to FIG. 10, a second embodiment of the present disclosure provides a method for manufacturing a wound capacitor package structure, which includes: firstly, referring to FIG. 1 and FIG. 7, filling a bottom filling material M1 into an initial packaging casing P (step S200); next, referring to FIG. 1, FIG. 7 and FIG. 8, placing a wound capacitor unit C (including a wound assembly 1 and a conductive assembly 2) into the initial packaging casing P and then positioning the wound capacitor unit C on the bottom filling material M1, in which the bottom filling material M1 is configured to surround and cover a first portion of the wound capacitor unit C (step S202); afterward, referring to FIG. 1, FIG. 8 and FIG. 9, forming an annular deformation structure 322 on the initial packaging casing P (step S204); and then referring to FIG. 1, FIG. 9 and FIG. 10, filling a top filling material M2 into the initial packaging casing P to surround and cover a second portion of the wound capacitor unit C and be limited by the annular deformation structure 322 (step S206).

For example, as shown in FIG. 8, in the step S202 of placing the wound capacitor unit C in the initial packaging casing P and positioning the wound capacitor unit C on the bottom filling material M1, the bottom filling material M1 can be preheated at a predetermined temperature (such as any positive integer between 150° C. and 200° C.) and a predetermined time (such as any positive integer between 60 seconds and 300 seconds) through a heating device (not shown), so that the bottom filling material M1 can be in a semi-cured state (or surface solidified state), thereby firmly positioning the wound capacitor unit C on the bottom base material M11. In addition, as shown in FIG. 9 and FIG. 10, the annular deformation structure 322 can be formed on the initial packaging casing P through a rolling device (not shown), so that the initial packaging casing P can be formed as a single-piece packaging casing 32 (or a one-piece package shell) for accommodating the bottom filling material M1 and the top filling material M2. In addition, as shown in FIG. 10, after the step S206 of filling the top filling material M2 into the initial packaging casing P, the bottom filling material M1 and the top filling material M2 can be respectively formed as a bottom filling material layer 311 and a top filling material layer 312 at a predetermined temperature (such as any positive integer between 150° C. and 200° C.) and a predetermined time (such as any positive integer between 20 minutes and 40 minutes, or any positive integer between 1200 seconds and 2400 seconds) through a heating device (not shown). It is worth noting that the bottom filling material M1 and the top filling material M2 can be made of silicone, epoxy or any kind of encapsulating material. However, the aforementioned details are disclosed for exemplary purposes only, and are not meant to limit the scope of the present disclosure.

Therefore, as shown in FIG. 1 and FIG. 7 to FIG. 10, a wound capacitor package structure S can be manufactured through the manufacturing method provided by the second embodiment of the present disclosure, which includes a wound assembly 1, a conductive assembly 2 and a packaging assembly 3.

Firstly, referring to FIG. 7 and FIG. 10, the wound assembly 1 includes a wound positive conductive foil 11, a wound negative conductive foil 12 and two wound separators 13 (or two wound insulating papers). For example, one of the two wound separators 13 can be disposed between the wound positive conductive foil 11 and the wound negative conductive foil 12, and one of the wound positive conductive foil 11 and the wound negative conductive foil 12 can be disposed between the two wound separators 13. In addition, the two wound separators 13 can be an insulating paper or insulating foil containing a dipping material such as a conductive polymer. However, the aforementioned details are disclosed for exemplary purposes only, and are not meant to limit the scope of the present disclosure.

Furthermore, as shown in FIG. 10, the conductive assembly 2 includes a first conductive pin 21 electrically contacting the wound positive conductive foil 11 and a second conductive pin 22 electrically contacting the wound negative conductive foil 12. More particularly, the first conductive pin 21 includes a first embedded portion 211 accommodated inside the packaging assembly 3 and a first exposed portion 212 exposed outside the packaging assembly 3, and the second conductive pin 22 includes a second embedded portion 221 accommodated inside the packaging assembly 3 and a second exposed portion 222 exposed outside the packaging assembly 3.

Moreover, as shown in FIG. 10, the packaging assembly 3 can be configured to completely encapsulate or enclose the wound assembly 1, and the packaging assembly 3 includes a filling body 31 for completely encapsulating or enclosing the wound assembly 1 and a single-piece packaging casing 32 (such as an aluminum shell or a packaging shell made of any material) for accommodating the filling body 31. More particularly, the filling body 31 includes a bottom filling material layer 311 and a top filling material layer 312 connected to the bottom filling material layer 311, the bottom filling material layer 311 can be configured to encapsulate or enclose a first portion of the wound assembly 1, and the top filling material layer 312 can be configured to encapsulate or enclose a second portion of the wound assembly 1, the first embedded portion 211 of the first conductive pin 21 and the second embedded portion 221 of the second conductive pin 22. In addition, the single-piece packaging casing 32 has an annular upright structure 321 (or a straight cylindrical structure) and an annular deformation structure 322 (or an annular inward structure) connected to the annular upright structure 321, the annular upright structure 321 can be configured for surroundingly accommodating the bottom filling material layer 311 and a first portion of the top filling material layer 312, and the annular deformation structure 322 can be configured for surroundingly accommodating a second portion of the top filling material layer 312.

For example, as shown in FIG. 10, the bottom filling material layer 311 of the filling body 31 includes a bottom base material portion 3111 configured for positioning the wound assembly 1, and a bottom surrounding material portion 3112 configured for surroundingly covering the first portion of the wound assembly 1, the bottom base material portion 3111 and the bottom surrounding material portion 3112 can be integrally formed so as to form the bottom filling material layer 311 (or two indistinguishable material structure layers), so that no connection interface is formed between the bottom base material portion 3111 and the bottom surrounding material portion 3112. Moreover, the top filling material layer 312 of the filling body 31 includes a first top surrounding material portion 3121 connected to the bottom surrounding material portion 3112, and a second top surrounding material portion 3122 connected to the first top surrounding material portion 3121, the first top surrounding material portion 3121 can be configured for surroundingly covering the second portion of the wound assembly 1, and the second top surrounding material portion 3122 can be configured for surroundingly covering the first embedded portion 211 of the first conductive pin 21 and the second embedded portion 221 of the second conductive pin 22 of the conductive assembly 2 (or the second top surrounding material portion 3122 can also be configured to adhere to the bottom seat plate). In addition, the annular deformation structure 322 of the single-piece packaging casing 32 has a surrounding concave position-limiting portion 3221 (or a surrounding inward recessed structure) connected to the annular upright structure 321 and recessed inward, and a surrounding convex end portion 3222 (or a surrounding inward curved structure) connected to the surrounding concave position-limiting portion 3221 and protruded outward, the surrounding concave position-limiting portion 3221 can be configured for surroundingly covering a portion of the second top surrounding material portion 3122 of the top filling material layer 312, and the surrounding convex end portion 3222 can be configured for surroundingly covering another portion of the second top surrounding material portion 3122 of the top filling material layer 312 and configured for completely exposing all of an outer surface of the second top surrounding material portion 3122 of the top filling material layer 312. However, the aforementioned details are disclosed for exemplary purposes only, and are not meant to limit the scope of the present disclosure.

It should be noted that as shown in FIG. 10, the bottom filling material layer 311 (or the bottom filling material M1) and the top filling material layer 312 (or the top filling material M2) have the same or different thermal insulation coefficients. For example, when the top filling material layer 312 and the bottom filling material layer 311 have different thermal conductivity coefficients, the thermal insulation coefficient of the top filling material layer 312 can be greater than the thermal insulation coefficient of the bottom filling material layer 311, thereby reducing the impact of external temperature on the wound assembly 1 through the top filling material layer 312 (or preventing the wound assembly 1 from been impacted by external temperature through the top filling material layer 312). However, the aforementioned details are disclosed for exemplary purposes only, and are not meant to limit the scope of the present disclosure.

It should be noted that as shown in FIG. 10, the bottom filling material layer 311 (or the bottom filling material M1) and the top filling material layer 312 (or the top filling material M2) have the same or different elastic coefficients. For example, when the top filling material layer 312 and the bottom filling material layer 311 have different elastic coefficients, the elastic coefficient of the top filling material layer 312 can be greater than the elastic coefficient of the bottom filling material layer 311, thereby reducing the impact of external forces on the wound assembly 1 through the top filling material layer 312 (or preventing the wound assembly 1 from been impacted by external forces through the top filling material layer 312). However, the aforementioned details are disclosed for exemplary purposes only, and are not meant to limit the scope of the present disclosure.

It should be noted that as shown in FIG. 6, the bottom filling material layer 311 (or the bottom filling material M1) and the top filling material layer 312 (or the top filling material M2) have the same or different viscosity coefficients. For example, when the top filling material layer 312 and the bottom filling material layer 311 have different viscosity coefficients, the viscosity coefficient of the top filling material layer 312 can be greater than the viscosity coefficient of the bottom filling material layer 311, thereby improving the strength of the bottom seat plate 4 adhering to the packaging assembly 3 through the top filling material layer 312. However, the aforementioned details are disclosed for exemplary purposes only, and are not meant to limit the scope of the present disclosure.

It should be noted that as shown in FIG. 10, the bottom filling material layer 311 (or the bottom filling material M1) and the top filling material layer 312 (or the top filling material M2) have the same or different heat resistance. For example, when the top filling material layer 312 and the bottom filling material layer 311 have different heat resistances, the heat resistance of the top filling material layer 312 can be greater than the heat resistance of the bottom filling material layer 311, thereby reducing the deformation of the top filling material layer 312 due to external temperature (or preventing the top filling material layer 312 from been deformed by external temperature). However, the aforementioned details are disclosed for exemplary purposes only, and are not meant to limit the scope of the present disclosure.

Therefore, referring to FIG. 9 and FIG. 10, the step S204 of forming the annular deformation structure 322 on the initial packaging casing P precedes the step S206 of filling the top filling material M2 into the initial packaging casing P, so that the top filling material layer 312 of the filling body 31 cannot be squeezed by the annular deformation structure 322 (or due to the deformation of the annular deformation structure 322 after the step S204 of forming the annular deformation structure 322 on the initial packaging casing P), and the first conductive pin 21 and the second conductive pin 22 of the conductive assembly 2 cannot be offset relative to the wound assembly 1 by the annular deformation structure 322 (or due to the deformation of the annular deformation structure 322 after the step S204 of forming the annular deformation structure 322 on the initial packaging casing P). More particularly, the second top surrounding material portion 3122 of the top filling material layer 312 cannot be squeezed by the annular deformation structure 322 (or due to the deformation of the annular deformation structure 322 after the step S204 of forming the annular deformation structure 322 on the initial packaging casing P), and the first conductive pin 21 and the second conductive pin 22 of the conductive assembly 2 cannot be offset relative to the wound assembly 1 by the second top surrounding material portion 3122 of the top filling material layer 312.

It should be noted that the top filling material layer 312 of the filling body 31 cannot be squeezed by the annular deformation structure 322 (or due to the deformation of the annular deformation structure 322 after the step S204 of forming the annular deformation structure 322 on the initial packaging casing P), thereby avoiding a first moisture path between the top filling material layer 312 and the annular deformation structure 322. Moreover, the first conductive pin 21 of the conductive assembly 2 cannot be offset relative to the wound assembly 1 by the annular deformation structure 322 (or due to the deformation of the annular deformation structure 322 after the step S204 of forming the annular deformation structure 322 on the initial packaging casing P), thereby avoiding a second moisture path between the top filling material layer 312 and the first conductive pin 21. In addition, the second conductive pin 22 of the conductive assembly 2 cannot be offset relative to the wound assembly 1 by the annular deformation structure 322 (or due to the deformation of the annular deformation structure 322 after the step S204 of forming the annular deformation structure 322 on the initial packaging casing P), thereby avoiding a third moisture path between the top filling material layer 312 and the second conductive pin 22.

Third Embodiment

Figure 11:
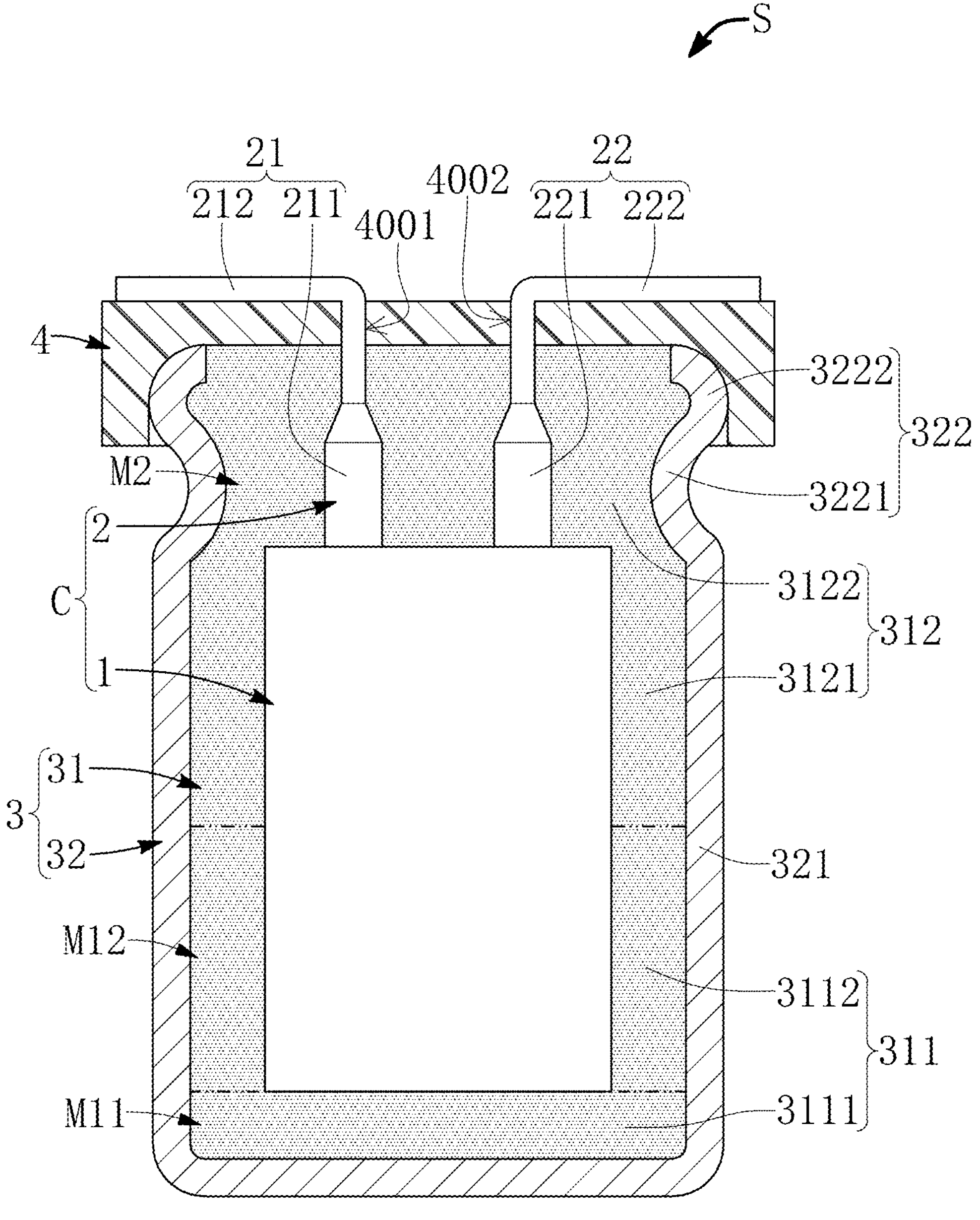
FIG. 11 is a schematic view of the wound capacitor package structure provided by a third embodiment of the present disclosure.
Figure 12:
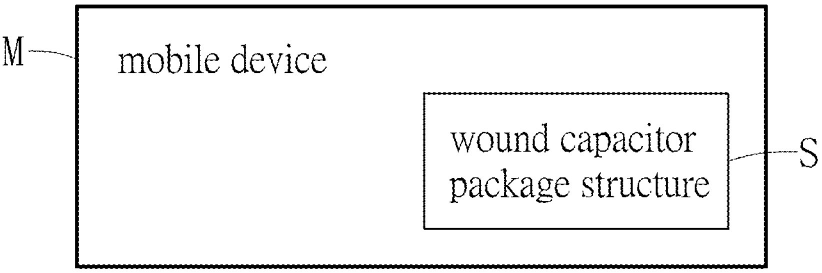
FIG. 12 is a functional block diagram of a mobile device provided by a fourth embodiment of the present disclosure.

Referring to FIG. 1 and FIG. 11, a third embodiment of the present disclosure provides a wound capacitor package structure S, which includes a wound assembly 1, a conductive assembly 2, a packaging assembly 3 and a bottom seat plate 4. Comparing FIG. 11 with FIG. 6, the main difference between the third embodiment and the first embodiment (or the second embodiment) is as follows: in the third embodiment, the method of manufacturing the wound capacitor package structure further includes: configuring a bottom base plate 4 on a bottom side of the packaging assembly 3 for cooperating with the packaging assembly 3 (step S110 and step S208); and then bending the first conductive pin 21 and the second conductive pin 22 relative to the bottom base plate 4 (step S112 and step S210).

For example, as shown in FIG. 11, the bottom seat plate 4 can be configured on the bottom side of the packaging assembly 3 through the adhesion provided by the second top surrounding material portion 3122, so as to cooperate with the packaging assembly 3. In addition, the bottom seat plate 4 has a first through hole 4001 and a second through hole 4002, and the first exposed portion 212 of the first conductive pin 21 and the second exposed portion 222 of the second conductive pin 22 can respectively pass through the first through hole 4001 and the second through hole 4002 of the bottom seat plate 4 and can extend in different directions by bending.

Fourth Embodiment

Referring to FIG. 6, FIG. 10, FIG. 11 and FIG. 12, a fourth embodiment of the present disclosure provides a mobile device M (or a movable device such as a vehicle, boat, aircraft or any kind of transportation, or a laptop, tablet or any kind of portable electronic device) configured to use a wound capacitor package structure S as provided in the first, the second, and the third embodiments.

Beneficial Effects of the Embodiments

In conclusion, in the mobile device M and the wound capacitor package structure S thereof provided by the present disclosure, by virtue of "the packaging assembly 3 including a filling body 31 for completely encapsulating or enclosing the wound assembly 1 and a single-piece packaging casing 32 for accommodating the filling body 31," "the filling body 31 including a bottom filling material layer 311 and a top filling material layer 312 connected to the bottom filling material layer 311, the bottom filling material layer 311 being configured to encapsulate or enclose a first portion of the wound assembly 1, and the top filling material layer 312 being configured to encapsulate or enclose a second portion of the wound assembly 1, the first embedded portion 211 of the first conductive pin 21 and the second embedded portion 221 of the second conductive pin 22" and "the single-piece packaging casing 32 having an annular upright structure 321 and an annular deformation structure 322 connected to the annular upright structure 321, the annular upright structure 321 being configured for surroundingly accommodating the bottom filling material layer 311 and a first portion of the top filling material layer 312, and the annular deformation structure 322 being configured for surroundingly accommodating a second portion of the top filling material layer 312," the top filling material layer 312 of the filling body 31 cannot be squeezed by the annular deformation structure 322, and the first conductive pin 21 and the second conductive pin 22 of the conductive assembly 2 cannot be offset relative to the wound assembly 1 by the annular deformation structure 322.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A wound capacitor package structure, comprising:

a wound assembly including a wound positive conductive foil, a wound negative conductive foil and two wound separators;

a conductive assembly including a first conductive pin electrically contacting the wound positive conductive foil and a second conductive pin electrically contacting the wound negative conductive foil;

a packaging assembly configured to completely encapsulate the wound assembly; and a bottom seat plate configured on a bottom side of the packaging assembly for cooperating with the packaging assembly;

wherein one of the two wound separators is disposed between the wound positive conductive foil and the wound negative conductive foil, and one of the wound positive conductive foil and the wound negative conductive foil is disposed between the two wound separators;

wherein the first conductive pin includes a first embedded portion accommodated inside the packaging assembly and a first exposed portion exposed outside the packaging assembly, and the second conductive pin includes a second embedded portion accommodated inside the packaging assembly and a second exposed portion exposed outside the packaging assembly;

wherein the packaging assembly includes a filling body for completely encapsulating the wound assembly and a single-piece packaging casing for accommodating the filling body;

wherein the filling body includes a bottom filling material layer and a top filling material layer connected to the bottom filling material layer, the bottom filling material layer is configured to encapsulate a first portion of the wound assembly, and the top filling material layer is configured to encapsulate a second portion of the wound assembly, the first embedded portion of the first conductive pin and the second embedded portion of the second conductive pin;

wherein the single-piece packaging casing has an annular upright structure and an annular deformation structure connected to the annular upright structure, the annular upright structure is configured for surroundingly accommodating the bottom filling material layer and a first portion of the top filling material layer, and the annular deformation structure is configured for surroundingly accommodating a second portion of the top filling material layer;

wherein the top filling material layer of the filling body is not squeezed by the annular deformation structure, and the first conductive pin and the second conductive pin of the conductive assembly are not offset relative to the wound assembly by the annular deformation structure.

2. The wound capacitor package structure according to claim 1, wherein the bottom filling material layer of the filling body includes a bottom base material portion configured for positioning the wound assembly and a bottom surrounding material portion configured for surroundingly covering the first portion of the wound assembly, the bottom base material portion and the bottom surrounding material portion are two independent portions, and the bottom base material portion and the bottom surrounding material portion are connected with each other to form a connection interface between the bottom base material portion and the bottom surrounding material portion;

wherein the top filling material layer of the filling body includes a first top surrounding material portion connected to the bottom surrounding material portion and a second top surrounding material portion connected to the first top surrounding material portion, the first top surrounding material portion is configured for surroundingly covering the second portion of the wound assembly, and the second top surrounding material portion is configured for surroundingly covering the first embedded portion of the first conductive pin and the second embedded portion of the second conductive pin of the conductive assembly and configured to adhere to the bottom seat plate;

wherein the second top surrounding material portion of the top filling material layer is not squeezed by the annular deformation structure, and the first conductive pin and the second conductive pin of the conductive assembly are not offset relative to the wound assembly by the second top surrounding material portion of the top filling material layer;

wherein the annular deformation structure of the single-piece packaging casing has a surrounding concave position-limiting portion connected to the annular upright structure and recessed inward, and a surrounding convex end portion connected to the surrounding concave position-limiting portion and protruded outward, the surrounding concave position-limiting portion is configured for surroundingly covering a portion of the second top surrounding material portion of the top filling material layer, and the surrounding convex end portion is configured for surroundingly covering another portion of the second top surrounding material portion of the top filling material layer and configured for completely exposing all of an outer surface of the second top surrounding material portion of the top filling material layer;

wherein the bottom seat plate has a first through hole and a second through hole, and the first exposed portion of the first conductive pin and the second exposed portion of the second conductive pin respectively pass through the first through hole and the second through hole of the bottom seat plate and extend in different directions by bending.

3. The wound capacitor package structure according to claim 1, wherein the bottom filling material layer of the filling body includes a bottom base material portion configured for positioning the wound assembly and a bottom surrounding material portion configured for surroundingly covering the first portion of the wound assembly, and the bottom base material portion and the bottom surrounding material portion are integrally formed to form the bottom filling material layer, so that no connection interface is formed between the bottom base material portion and the bottom surrounding material portion;

wherein the top filling material layer of the filling body includes a first top surrounding material portion connected to the bottom surrounding material portion and a second top surrounding material portion connected to the first top surrounding material portion, the first top surrounding material portion is configured for surroundingly covering the second portion of the wound assembly, and the second top surrounding material portion is configured for surroundingly covering the first embedded portion of the first conductive pin and the second embedded portion of the second conductive pin of the conductive assembly and configured to adhere to the bottom seat plate;

wherein the second top surrounding material portion of the top filling material layer is not squeezed by the annular deformation structure, and the first conductive pin and the second conductive pin of the conductive assembly are not offset relative to the wound assembly by the second top surrounding material portion of the top filling material layer;

wherein the annular deformation structure of the single-piece packaging casing has a surrounding concave position-limiting portion connected to the annular upright structure and recessed inward, and a surrounding convex end portion connected to the surrounding concave position-limiting portion and protruded outward, the surrounding concave position-limiting portion is configured for surroundingly covering a portion of the second top surrounding material portion of the top filling material layer, and the surrounding convex end portion is configured for surroundingly covering another portion of the second top surrounding material portion of the top filling material layer and configured for completely exposing all of an outer surface of the second top surrounding material portion of the top filling material layer;

wherein the bottom seat plate has a first through hole and a second through hole, and the first exposed portion of the first conductive pin and the second exposed portion of the second conductive pin respectively pass through the first through hole and the second through hole of the bottom seat plate and extend in different directions by bending.

4. The wound capacitor package structure according to claim 1, wherein the bottom filling material layer and the top filling material layer have the same or different thermal insulation coefficients;

wherein, when the top filling material layer and the bottom filling material layer have different thermal conductivity coefficients, the thermal insulation coefficient of the top filling material layer is greater than the thermal insulation coefficient of the bottom filling material layer, thereby reducing the impact of external temperature on the wound assembly through the top filling material layer;

wherein the bottom filling material layer and the top filling material layer have the same or different elastic coefficients;

wherein, when the top filling material layer and the bottom filling material layer have different elastic coefficients, the elastic coefficient of the top filling material layer is greater than the elastic coefficient of the bottom filling material layer, thereby reducing the impact of external forces on the wound assembly through the top filling material layer;

wherein the bottom filling material layer and the top filling material layer have the same or different viscosity coefficients;

wherein, when the top filling material layer and the bottom filling material layer have different viscosity coefficients, the viscosity coefficient of the top filling material layer is greater than the viscosity coefficient of the bottom filling material layer, thereby improving the strength of the bottom seat plate adhering to the packaging assembly through the top filling material layer;

wherein the bottom filling material layer and the top filling material layer have the same or different heat resistance;

wherein, when the top filling material layer and the bottom filling material layer have different heat resistances, the heat resistance of the top filling material layer is greater than the heat resistance of the bottom filling material layer, thereby reducing the deformation of the top filling material layer due to external temperature;

wherein the top filling material layer of the filling body is not squeezed by the annular deformation structure, thereby avoiding a first moisture path between the top filling material layer and the annular deformation structure;

wherein the first conductive pin of the conductive assembly is not offset relative to the wound assembly by the annular deformation structure, thereby avoiding a second moisture path between the top filling material layer and the first conductive pin;

wherein the second conductive pin of the conductive assembly is not offset relative to the wound assembly by the annular deformation structure, thereby avoiding a third moisture path between the top filling material layer and the second conductive pin.

5. A wound capacitor package structure, comprising:

a wound assembly;

a conductive assembly including a first conductive pin electrically contacting the wound assembly and a second conductive pin electrically contacting the wound assembly; and a packaging assembly configured to completely encapsulate the wound assembly;

wherein the first conductive pin includes a first embedded portion accommodated inside the packaging assembly and a first exposed portion exposed outside the packaging assembly, and the second conductive pin includes a second embedded portion accommodated inside the packaging assembly and a second exposed portion exposed outside the packaging assembly;

wherein the packaging assembly includes a filling body for completely encapsulating the wound assembly and a single-piece packaging casing for accommodating the filling body;

wherein the filling body includes a bottom filling material layer and a top filling material layer connected to the bottom filling material layer, the bottom filling material layer is configured to encapsulate a first portion of the wound assembly, and the top filling material layer is configured to encapsulate a second portion of the wound assembly, the first embedded portion of the first conductive pin and the second embedded portion of the second conductive pin;

wherein the single-piece packaging casing has an annular upright structure and an annular deformation structure connected to the annular upright structure, the annular upright structure is configured for surroundingly accommodating the bottom filling material layer and a first portion of the top filling material layer, and the annular deformation structure is configured for surroundingly accommodating a second portion of the top filling material layer;

wherein the top filling material layer of the filling body is not squeezed by the annular deformation structure, and the first conductive pin and the second conductive pin of the conductive assembly are not offset relative to the wound assembly by the annular deformation structure.

6. The wound capacitor package structure according to claim 5, wherein the bottom filling material layer of the filling body includes a bottom base material portion configured for positioning the wound assembly and a bottom surrounding material portion configured for surroundingly covering the first portion of the wound assembly, the bottom base material portion and the bottom surrounding material portion are two independent portions, and the bottom base material portion and the bottom surrounding material portion are connected with each other to form a connection interface between the bottom base material portion and the bottom surrounding material portion;

wherein the top filling material layer of the filling body includes a first top surrounding material portion connected to the bottom surrounding material portion and a second top surrounding material portion connected to the first top surrounding material portion, the first top surrounding material portion is configured for surroundingly covering the second portion of the wound assembly, and the second top surrounding material portion is configured for surroundingly covering the first embedded portion of the first conductive pin and the second embedded portion of the second conductive pin of the conductive assembly;

wherein the second top surrounding material portion of the top filling material layer is not squeezed by the annular deformation structure, and the first conductive pin and the second conductive pin of the conductive assembly are not offset relative to the wound assembly by the second top surrounding material portion of the top filling material layer;

wherein the annular deformation structure of the single-piece packaging casing has a surrounding concave position-limiting portion connected to the annular upright structure and recessed inward, and a surrounding convex end portion connected to the surrounding concave position-limiting portion and protruded outward, the surrounding concave position-limiting portion is configured for surroundingly covering a portion of the second top surrounding material portion of the top filling material layer, and the surrounding convex end portion is configured for surroundingly covering another portion of the second top surrounding material portion of the top filling material layer and configured for completely exposing all of an outer surface of the second top surrounding material portion of the top filling material layer.

7. The wound capacitor package structure according to claim 5, wherein the bottom filling material layer of the filling body includes a bottom base material portion configured for positioning the wound assembly and a bottom surrounding material portion configured for surroundingly covering the first portion of the wound assembly, and the bottom base material portion and the bottom surrounding material portion are integrally formed to form the bottom filling material layer, so that no connection interface is formed between the bottom base material portion and the bottom surrounding material portion;

wherein the top filling material layer of the filling body includes a first top surrounding material portion connected to the bottom surrounding material portion and a second top surrounding material portion connected to the first top surrounding material portion, the first top surrounding material portion is configured for surroundingly covering the second portion of the wound assembly, and the second top surrounding material portion is configured for surroundingly covering the first embedded portion of the first conductive pin and the second embedded portion of the second conductive pin of the conductive assembly;

wherein the second top surrounding material portion of the top filling material layer is not squeezed by the annular deformation structure, and the first conductive pin and the second conductive pin of the conductive assembly are not offset relative to the wound assembly by the second top surrounding material portion of the top filling material layer;

wherein the annular deformation structure of the single-piece packaging casing has a surrounding concave position-limiting portion connected to the annular upright structure and recessed inward, and a surrounding convex end portion connected to the surrounding concave position-limiting portion and protruded outward, the surrounding concave position-limiting portion is configured for surroundingly covering a portion of the second top surrounding material portion of the top filling material layer, and the surrounding convex end portion is configured for surroundingly covering another portion of the second top surrounding material portion of the top filling material layer and configured for completely exposing all of an outer surface of the second top surrounding material portion of the top filling material layer.

8. The wound capacitor package structure according to claim 5, wherein the bottom filling material layer and the top filling material layer have the same or different thermal insulation coefficients;

wherein, when the top filling material layer and the bottom filling material layer have different thermal conductivity coefficients, the thermal insulation coefficient of the top filling material layer is greater than the thermal insulation coefficient of the bottom filling material layer, thereby reducing the impact of external temperature on the wound assembly through the top filling material layer;

wherein the bottom filling material layer and the top filling material layer have the same or different elastic coefficients;

wherein, when the top filling material layer and the bottom filling material layer have different elastic coefficients, the elastic coefficient of the top filling material layer is greater than the elastic coefficient of the bottom filling material layer, thereby reducing the impact of external forces on the wound assembly through the top filling material layer;

wherein the bottom filling material layer and the top filling material layer have the same or different viscosity coefficients;

wherein, when the top filling material layer and the bottom filling material layer have different viscosity coefficients, the viscosity coefficient of the top filling material layer is greater than the viscosity coefficient of the bottom filling material layer, thereby improving the strength of a bottom seat plate adhering to the packaging assembly through the top filling material layer;

wherein the bottom filling material layer and the top filling material layer have the same or different heat resistance;

wherein, when the top filling material layer and the bottom filling material layer have different heat resistances, the heat resistance of the top filling material layer is greater than the heat resistance of the bottom filling material layer, thereby reducing the deformation of the top filling material layer due to external temperature;

wherein the top filling material layer of the filling body is not squeezed by the annular deformation structure, thereby avoiding a first moisture path between the top filling material layer and the annular deformation structure;

wherein the first conductive pin of the conductive assembly is not offset relative to the wound assembly by the annular deformation structure, thereby avoiding a second moisture path between the top filling material layer and the first conductive pin;

wherein the second conductive pin of the conductive assembly is not offset relative to the wound assembly by the annular deformation structure, thereby avoiding a third moisture path between the top filling material layer and the second conductive pin.

9. A mobile device configured to use a wound capacitor package structure, characterized in that the wound capacitor package structure comprises:

a wound assembly;

a conductive assembly including a first conductive pin electrically contacting the wound assembly and a second conductive pin electrically contacting the wound assembly; and a packaging assembly configured to completely encapsulate the wound assembly;

wherein the first conductive pin includes a first embedded portion accommodated inside the packaging assembly and a first exposed portion exposed outside the packaging assembly, and the second conductive pin includes a second embedded portion accommodated inside the packaging assembly and a second exposed portion exposed outside the packaging assembly;

wherein the packaging assembly includes a filling body for completely encapsulating the wound assembly and a single-piece packaging casing for accommodating the filling body;

wherein the filling body includes a bottom filling material layer and a top filling material layer connected to the bottom filling material layer, the bottom filling material layer is configured to encapsulate a first portion of the wound assembly, and the top filling material layer is configured to encapsulate a second portion of the wound assembly, the first embedded portion of the first conductive pin and the second embedded portion of the second conductive pin;

wherein the single-piece packaging casing has an annular upright structure and an annular deformation structure connected to the annular upright structure, the annular upright structure is configured for surroundingly accommodating the bottom filling material layer and a first portion of the top filling material layer, and the annular deformation structure is configured for surroundingly accommodating a second portion of the top filling material layer;

wherein the top filling material layer of the filling body is not squeezed by the annular deformation structure, and the first conductive pin and the second conductive pin of the conductive assembly are not offset relative to the wound assembly by the annular deformation structure.

10. The mobile device according to claim 9, wherein the bottom filling material layer and the top filling material layer have the same or different thermal insulation coefficients;

wherein, when the top filling material layer and the bottom filling material layer have different thermal conductivity coefficients, the thermal insulation coefficient of the top filling material layer is greater than the thermal insulation coefficient of the bottom filling material layer, thereby reducing the impact of external temperature on the wound assembly through the top filling material layer;

wherein the bottom filling material layer and the top filling material layer have the same or different elastic coefficients;

wherein, when the top filling material layer and the bottom filling material layer have different elastic coefficients, the elastic coefficient of the top filling material layer is greater than the elastic coefficient of the bottom filling material layer, thereby reducing the impact of external forces on the wound assembly through the top filling material layer;

wherein the bottom filling material layer and the top filling material layer have the same or different viscosity coefficients;

wherein, when the top filling material layer and the bottom filling material layer have different viscosity coefficients, the viscosity coefficient of the top filling material layer is greater than the viscosity coefficient of the bottom filling material layer, thereby improving the strength of a bottom seat plate adhering to the packaging assembly through the top filling material layer;

wherein the bottom filling material layer and the top filling material layer have the same or different heat resistance;

wherein, when the top filling material layer and the bottom filling material layer have different heat resistances, the heat resistance of the top filling material layer is greater than the heat resistance of the bottom filling material layer, thereby reducing the deformation of the top filling material layer due to external temperature;

wherein the top filling material layer of the filling body is not squeezed by the annular deformation structure, thereby avoiding a first moisture path between the top filling material layer and the annular deformation structure;

wherein the first conductive pin of the conductive assembly is not offset relative to the wound assembly by the annular deformation structure, thereby avoiding a second moisture path between the top filling material layer and the first conductive pin;

wherein the second conductive pin of the conductive assembly is not offset relative to the wound assembly by the annular deformation structure, thereby avoiding a third moisture path between the top filling material layer and the second conductive pin.

* * * * *